(12) United States Patent
Kinsley, Jr.

(10) Patent No.: US 6,830,656 B2
(45) Date of Patent: Dec. 14, 2004

(54) NON-WOVEN FIBER WEBS WITH NYLON BINDER

(75) Inventor: Homan B. Kinsley, Jr., Powhatan, VA (US)

(73) Assignee: FiberMark, Inc., Brattleboro, VT (US)

( * ) Notice: Subject to any disclaimer, the term of this patent is extended or adjusted under 35 U.S.C. 154(b) by 276 days.

(21) Appl. No.: 10/134,623

(22) Filed: Apr. 30, 2002

(65) Prior Publication Data

US 2003/0201082 A1 Oct. 30, 2003

(51) Int. Cl.$^7$ .................. D21H 25/00; D21H 27/00; D21H 13/36; D21H 11/00; D21H 13/00; D21H 15/00; D21H 17/00; D21H 19/00; D21H 21/00; D21H 23/00

(52) U.S. Cl. .................. 162/101; 162/145; 162/152; 162/157.1; 162/164.1

(58) Field of Search .................. 162/101, 138, 162/145, 146, 164.1, 152, 157.1; 442/364, 376, 377, 415

(56) References Cited

U.S. PATENT DOCUMENTS

| | | | |
|---|---|---|---|
| 3,067,087 A | * | 12/1962 | Gorski et al. ............ 162/157.3 |
| 4,200,488 A | * | 4/1980 | Brandon et al. ............ 162/101 |
| 5,064,890 A | | 11/1991 | Tsurumaru et al. |
| 5,304,330 A | | 4/1994 | Tatarchuk et al. |
| 5,472,278 A | * | 12/1995 | Kawaoka et al. ............ 366/262 |
| 5,508,093 A | | 4/1996 | Mehdorn |
| 5,876,643 A | * | 3/1999 | Biggs et al. ................. 162/101 |
| 5,955,177 A | | 9/1999 | Sanocki et al. |
| 6,616,802 B1 | * | 9/2003 | Kinsley et al. ............. 162/101 |
| 6,682,215 B2 | * | 1/2004 | Kinsley et al. ............. 162/101 |

* cited by examiner

Primary Examiner—Elizabeth M. Cole
Assistant Examiner—Jeremy R. Pierce
(74) Attorney, Agent, or Firm—Burns, Doane, Swecker & Mathis, L.L.P.

(57) ABSTRACT

The present invention relates to a nonwoven web comprised of metal or refractory fibers with nylon as a binder. The nonwoven web is prepared by forming a foam furnish by agitating the fibers in a foamed medium, and passing the foam furnish onto a screen and defoaming the furnish. It is preferred that the nylon binder is added to the foam furnish in the form of fibers. Once the furnish is defoamed to form a nonwoven web, the sheet is dried at a temperature sufficient to melt the nylon binder.

7 Claims, No Drawings

NON-WOVEN FIBER WEBS WITH NYLON BINDER

FIELD OF THE INVENTION

The present invention relates to a process for making wet-layed fibrous, nonwoven webs or sheets. In particular, the present invention relates to such webs comprised of metal or refractory fibers, with nylon as a binder.

DESCRIPTION OF THE RELATED ART

Papers comprised primarily of metal or refractory fibers have been desired by the industry for many years. Various methods have been developed for the preparation of metal fiber sheets. The manufacture of metal fiber nonwoven fabric-like paper structures on papermaking equipment has also been actively pursued due to its commercial attractiveness. Interest in such techniques is described, for example, in the chapter on metal fibers by Hanns F. Arledter in *Synthetic Fibers in Papermaking*, Editor O. Battista, chapter 6, pages 118–184. See also U.S. Pat. No. 2,971,877.

The problem in making metal fiber webs or sheets using conventional papermaking techniques is that the metal fibers tend to clump together. This can also be true for refractory fibers, particularly when the fibers are of some length, e.g., greater than ½ inch. Before paper can be made, it is necessary to open fiber bundles to achieve individual fibers and to disperse the fibers uniformly in a fluid. With most wood pulps, the opening is not usually a difficult task. The pulp or source of fibers is placed in water and the mixture is sheared until the bundles open.

With metal and refractory fibers, both the opening of the bundles and the dispersion of the fibers in order to keep the fibers separated are difficult. Normal types of mixing or shearing devices can easily damage metal and refractory fibers. When metal fibers are bent, they will remain bent and eventually will interact to form balls of tangled fibers. Refractory fibers also tend to tangle. Paper made from fibers in this form is unacceptable.

In addition to an improved process, an appropriate binder for metal and refractory fibers is also an important issue. The binder stabilizes the non-woven web and provides strength. The same binders useful for cellulose fibers may not be as useful for metal or refractory fibers. Therefore, use of an appropriate binder can improve metal fiber or refractory fiber sheets for particular applications, or in general, while continuing to use conventional processing.

It would therefore be of great interest to the industry to improve sheets of metal fibers and for refractory fibers by using an improved binder therefor.

It would also be of great advantage to the industry if a process for making a metal or refractory fiber sheet using conventional papermaking techniques, i.e., a wet-laying technique, was available. Such a process should offer efficiency and commercial viability particularly in terms of cost and performance. A combination of an improved binder with such a process would be highly valued.

Accordingly, it is an object of the present invention to provide a non-woven metal or refractory fiber sheet with nylon as the binder.

Yet another object of the present inventions to provide a process for making a wet-layed metal fiber nonwoven sheet which is efficient and effective.

These and other objects of the present invention will become apparent upon a review of the following specification and the claims appended thereto.

SUMMARY OF THE INVENTION

In accordance with the foregoing objectives, provided by the present invention is a nonwoven fiber web which employs nylon as the binder. The web is preferably comprised of metal or refractory fibers, for which the nylon binder has been found to work extremely well with metal fibers and refractory fibers such as carbon fibers. As a binder, it provides excellent strength and a very suitable melting point for applications in which the metal fiber sheets or refractory fiber sheets would be used.

In another embodiment, the present invention provides a process for making a wet-layed, metal fiber or refractory fiber nonwoven web. The process comprises forming a foam furnish by agitating metal fibers or refractory fibers in a foamed medium with an apparatus comprising agitating means mounted for displacement within the foamed medium and including a leading surface facing in the direction of displacement. The leading surface comprises upper and lower portions converging in the direction of displacement to form a generally convex leading surface. Preferably, the agitating means includes a non convex trailing surface facing away the direction of displacement, the surface being generally concave. The apparatus used in agitating the fibers also comprises driving means for displacing the agitating means in the direction of displacement for dispersing and mutually separating the fibers within the foamed medium. The foam furnish is then passed onto a screen and defoamed to form the nonwoven fibrous web.

Among other factors, the present invention is at least partly based upon the recognition that nylon is a uniquely applicable binder for metal fibers or refractory fibers such as carbon. The use of nylon permits one to form strong, nonwoven webs of metal fibers or refractory fibers, which have applicability in harsh environments. Furthermore, employing the process of the present invention one can form extremely uniform webs of the metal fibers and refractory fibers, with the nylon binders being employed and binding the fiber structures at the interstices.

DETAILED DESCRIPTION OF THE PREFERRED EMBODIMENTS

The nonwoven, fibrous web of the present invention is comprised of metal fibers and/or refractory fibers, and nylon as the binder. It has been found that nylon works extremely well as a binder for metal fibers, and refractory fibers such as carbon, in a nonwoven structure. The use of nylon as a binder in a metal or refractory fibrous sheet provides the necessary strength, as well as thermal and chemical resistance properties, to permit use of the sheets in many different environments. The amount of nylon employed can vary greatly, but is generally in the range of from 3 to 20 wt %, more preferably in the range of from 5 to 15 wt %, and most preferably in the range of from 5 to 10 wt %.

Nylon is a polyamide having monomer units joined by midgroups [CONHRNHCOR']$_n$ and are prepared from diamines and dicarboxylic acids, or in the case of [RCONH]$_n$, from lactams. In nylon, the R and R' are aliphatic, alicyclic, or mixtures containing less than 85 wt % aromatic moieties.

The most readily available nylon products are nylon 66 and nylon 6. Except for a slight difference in melting point, the properties of the two forms are almost identical, though their chemical derivations are quite different. Nylon 66 is a condensation product of adipic acid and hexamethylene diamine. Nylon 6 is a in polymer of caprolactam. Nylon exhibits low water absorption, good electrical resistance and good wet strength, i.e., about 90% of dry strength. Nylons are also generally resistant to alkalis and cold abrasion and are insoluble in most organic solvents. The melting point of nylon 66 is 264° C., and that of nylon 6 is 223° C. The use of nylon 6 is preferred due to the lower melting point as it is easier to dry/melt the nylon to allow its action as a binder at the interstices of a nonwoven web.

The nylon binder is generally employed as a fiber. Other forms of nylon binder can be employed, e.g., a powder, but the use of a fiber is preferred due to its expediency and efficiency in use. The nylon fibers can be comprised of a single polymer, a mixture of polymers, or a sheath/core fiber. In the sheath/core fiber, the sheath or outside surface of the fiber would be composed of one type of nylon polymer, and the core would be composed of a different nylon polymer. For example, the sheath can be composed of nylon 6, whereas the core is composed of nylon 66. It is preferred in such a structure that the higher melting point polymer comprise the core portion, and the lower melting point polymer the sheath portion, thereby allowing the sheath to melt and bind while the core continues to provide strength and stability. Such sheath/core fibers can be prepared using conventional processing.

In using nylon fibers, the fibers would simply be added to a furnish comprised of the base fibers to be used in creating the nonwoven sheet, e.g., metal fibers or refractory fibers, and then the sheet or web being formed from the furnish. Once the sheet has been formed, the sheet is then dried at a temperature sufficient to melt the nylon used such that the nylon can melt around the interstices of the base fibers used to construct the nonwoven sheet, and thereby bind the base fibers into a nonwoven, but integral structure. As noted above, nylon 6 is the preferred nylon fiber to be used as a binder since its melting point is about 223° C., i.e., less than that of nylon 66, and therefore a lower temperature is needed to dry and melt the nylon binder.

The metal fibers can be any useful metal fiber, with nickel, zinc and stainless steel fibers being most preferred. The stainless steel fibers can, for example, be stainless steel 304 fibers, stainless steel 16 fibers or stainless steel Hastelloy X fibers. All are commercially available. The nickel fibers can be any commercially available fiber as well. Zinc fibers are generally made from a foil of zinc, from which tinsel is made, and the tinsel is chopped to make the fibers. Such zinc fibers, nickel fibers and stainless steel fibers are most preferred because their potential uses are exceptional.

The refractory fibers can be any refractory fiber, having any length. By refractory fibers is meant fibers prepared from a refractory material. Refractory materials can be earthy, ceramic materials of low thermal conductivity that are capable of withstanding extremely high temperatures (3000–4000° F.) without essential change. There are three broad groups of such materials, (i) acidic (e.g., silica, fireclay), (ii) basic (e.g., magnesite, dolomite); and (iii) amphoteric (e.g., alumina, carbon and silicon carbide). The outstanding property of these materials, and the fibrous webs prepared from their fibers, is the ability to act as insulators.

The present invention is particularly useful with and applicable to carbon fibers. Carbon fibers are generally prepared by the controlled pyrolysis of an organic precursor in fibrous form. Commercial products are based on rayon (a regenerated cellulose), pitch (petroleum and coal tar based), and PAN (polyacrylonitrile). The carbon fibers can also be graphite fibers, or activated carbon fibers.

More specifically, the term carbon fiber generally refers to materials that have been heat treated at temperatures of 1000–3000° C. and have markedly different properties and structure, i.e., they contain at least 92% carbon. In practice, the term carbon fiber sometimes refers to materials treated in the range of from 1000–2000° C., and the term graphite fiber refers to fibers processed at or in excess of 2500° C. Activated carbon and its fibers are obtained by "activating" a carbon fiber by heating at 800–900° C. with steam or carbon dioxide to result in a porous internal structure (honeycomb like). The internal surface of activated carbon in general averages about 10,000 square feet/gm, and the specific gravity is from 0.08 to 0.5.

Many inorganic fibers qualify as refractory fibers in accordance with the present invention. Such inorganic fibers include glass fibers, quartz and silica fibers, and ceramic fibers.

Glass is an amorphous material obtained by supercooling the molten glass, so that no ordered regions are formed. Glass fibers are prepared generally by melt spinning glass.

Silica fibers are smooth-surfaced, glasslike fibers, with a near round cross section. They are spun from silicon dioxide, which may be pure or contain a small amount of other materials. Silica fibers can be produced indirectly from glass filaments from which all constituents other than silica have been removed or through spinning a viscous filament that contains a high amount of silica. The organic materials are burned away, leaving a porous silica filament.

Quartz fibers are made from natural quartz crystals by softening quartz rods in an oxy-hydrogen flame and drawing the rods into filaments. Because high purity quartz crystals are rare, the cost of quartz fibers is considerably higher than that of fiberglass and high silica fibers.

Ceramic fibers are polycrystalline refractory materials composed of metal oxides, metal carbides, metal nitrides, and their mixtures. Starting materials include aluminum silicate, alumina, zirconia, boron nitride, silicon nitride, thoria, aluminum nitride, silicon nitride, potassium titanate, and polymeric materials such as polycarbosilane. Compared to glass fiber, ceramic fibers have higher thermal and chemical resistance, and higher oxidation resistance than carbon and graphite fibers. The densities of ceramic fibers are generally higher than those of glass, carbon, and graphite fibers.

While the length of the fibers used can be of any length, the present invention is most uniquely and advantageously applicable to long fibers, i.e., at least one-half inch. Refractory or metal fibers of a length of one inch, one and one-half inch, two inches or more, even four inches in length, can also be readily incorporated into a non-woven fibrous web using the present agitator and foam process of the present invention, and are therefore preferred.

As noted above, the present invention is uniquely applicable to the formation of a non-woven fibrous web comprised of metal or refractory fibers, which can be in mixture with each other, or with other fibers, such as cellulosic, and synthetic fibers, in minor amounts.

While the nonwoven, fibrous webs of the present invention using nylon as a binder can be prepared using any conventional wet laying method, it is preferred that a foam method is employed to make the sheets of the present invention. In a preferred embodiment, the process of the present invention comprises the steps of first forming a foam furnish by agitating a fiber mixture comprised of the metal or refractory fibers, and the nylon binder, preferably in fiber form. The fiber mixture is agitated in a foamed medium with the agitation apparatus of the present invention, with the foam furnish then being passed onto a screen, e.g., a wire or plastic fabricated screen, and the furnish defoamed. Once the nonwoven web is formed, it is dried using conventional means, such as drying cans, at a temperature sufficient to melt the nylon and have it coalesce around the interstices of the base fibers employed in the nonwoven sheets.

The agitating apparatus used in the process of the present invention is mounted for displacement within the foamed medium and includes a leading surface facing in a direction of displacement. A leading surface includes upper and lower portions converging in the direction of displacement to form a generally convex leading surface, and preferably includes a non-convex trailing surface facing away from the direction of displacement, which trailing surface is generally concave. The agitating means also comprises driving means for displacing the agitating means in the direction of displacement or dispersing and mutually separating the fibers within the foamed medium.

More specifically, the agitator generally comprises a plurality of legs or blades projecting radially from an axis. The number of legs can vary, and can be in different planes. Each leg includes a leading surface facing in the direction of rotational displacement, which surface is of convex shape as is the leg viewed in cross-section. By convex is meant that the upper and lower portions of the leading surface converge in the direction of rotation and meet at a relatively blunt junction. The bluntness of the junction precludes the collection of fibers. It is also preferred that the leading surface be smooth so that the fibers slip over its surface without forming flocks, spindles, or other forms of fiber aggregates.

The leading surface terminates in vertically spaced upper and lower trailing ends which form edges. The trailing surface of the leg is therefore non-convex, e.g., concave. The truncation of a hollow cylinder represents a convenient way of forming the agitator, but, of course, other techniques could be used to form an agitator of the desired shape.

The foamed medium in which the refractory fibers are agitated can be formed during the agitation, or can be formed prior to the agitation of the fibers. When forming the foamed medium in situ, the order of addition of water, chemicals (binder), surfactant and fiber is not important. The surfactant, water and refractory fiber can be added into the mixing chamber in any order. Once the agitator is started, a successful foam dispersed refractory fiber will result. It is generally preferred, however, to not mix the fibers in the water without the presence of a surfactant. Since no foam would be generated without the surfactant, the refractory fibers would tend to tangle and agglomerate. It is possible, however, to successfully disperse the refractory fibers in a pre-existing foam.

In a preferred embodiment, rotation of the agitator is initiated after the mixture of fibers, water, and surfactant is placed within an agitation chamber. In response to that rotation, the surfactant and water produce a foamed medium in which the fibers are entrained. As the agitator travels through the mixture, fibers impacted by the agitator are displaced upwardly or downwardly by the convex leading surface.

The convex leading surface of the agitator and the trailing concave following edge are important to the proper dispersion of the fibers. Fibers are impacted by the leading convex surface. This surface is made to be smooth so that the fibers will slide along this surface without forming multi-fiber aggregates. As the fibers leave this smooth convex surface they enter the abrupt transition to a concave surface. Intense cavitation occurs at this transition. Air pulled into this zone from the tank vortex or air added to the tank from some other source such as a pipe at the bottom, forms a foam which is stabilized by the presence of a surfactant which has been added to the water. This foam is characterized by small bubble size. Thus the fibers entering this zone of bubble formation are immediately surround by foam. Since the foam possesses a high viscosity and low density, the fibers surrounded by foam are prevented from tangling or flocculating as would be the case if they were in water. Thus, the use of a foam medium is a preferred embodiment for the fibers of the present invention. This type of agitation is unique in its ability to disperse such fiber into a foam uniformly.

The convex leading surface of the agitator and the trailing concave following edge are important to the proper function of the apparatus. Fibers are impacted by the leading convex surface. This surface is made to be smooth so that the refractory fibers will slide along this surface without forming multi-fiber aggregates. As the refractory fibers leave this smooth convex surface they enter the abrupt transition to a concave surface. Intense cavitation occurs at this transition. Air pulled into this zone from the tank vortex or air added to the tank from some other source such as a pipe at the bottom, forms a foam which is stabilized by the presence of a surfactant which has been added to the water. This foam is characterized by small bubble size. Thus the refractory fibers entering this zone of bubble formation are immediately surrounded by foam. Since the foam possesses a high viscosity and low density, the refractory fibers surrounded by foam are prevented from tangling or flocculating as would be the case if they were in water. This apparatus is unique in its ability to disperse fibers into a foam uniformly.

Further detail regarding the agitator and its use in a foam process is found in U.S. Pat. No. 6,616,802, issued Sep. 9, 2003, and U.S. Pat. No. 6,682,215, issued Jan. 27, 2004, which are hereby expressly incorporated by reference in their entirety.

The concentration of the surfactant used depends on the surfactant. Generally, a concentration of about 0.1 wt % in the solution is preferred for a strong foam forming surfactant. If the surfactant is a weaker foam former, a stronger concentration may be preferred. Anionic, non-ionic and cationic surfactants can all be used, with appropriate adjustments in concentration where needed.

The time the foam furnish is mixed by the agitator of the present invention can vary greatly, as it is only important that a good dispersion of the fiber in the foam is achieved. Once a good dispersion has been achieved, longer mixing or agitation is generally neither helpful or harmful.

The temperature of the foam furnish can also vary greatly. The temperature need only be such so as to allow a foam to be generated.

Other conventional, functional additives can also be added to the foam furnish, as long as they do not interfere with the foaming nature of the surfactant. Polymeric binders can be added, and are preferred. For example, polyvinyl alcohol powder has provided good results, and is a preferred additive. Aluminum sulfate or paper maker's alum can also be added with a compatible surfactant.

Once the foam furnish has been made, the foam furnish is then passed onto a screen, such as that generally used in a typical Foudrinier machine. The foam furnish is then defoamed by using vacuum or suction boxes. Any of the conventional methods and apparatus for forming a fibrous web while using a foam can be employed with the foam furnish of the present invention. The use of the agitation means of the present invention provides a foam furnish with a uniform dispersion of the fibers. As a result, the fibrous web obtained upon defoaming is a web exhibiting good individual fiber separation and a very uniform distribution. As well, there is no directionality of the fibers, i.e., the fiber direction is random, but with a uniform distribution of the fibers.

Such a uniform fibrous web is obtained even when one employs very long fibers, such as fibers having a length of one-half inch, one inch, two inches or longer, and even if cellulosic or synthetic fibers are mixed with the refractory or metal fibers. This is one of the greatest advantages of the present invention in that it permits one to make a fibrous web comprised of long refractory or metal fibers, if desired, even in combination with other types of fibers, as easily and as quickly as one could make a paper web.

The nonwoven sheets of the present invention employ nylon as the binder and find many useful applications. For example, when a refractory fiber such as carbon is used to make a carbon fiber sheet, nylon as the binder improves its performance for use in fuel cells. The nylon is quite resistant to the environment in the fuel cell and thus is an extraordinary binder for the carbon nonwoven sheet. The nylon binder can also be used with metal fibers for use in electrodes to make sheets useful in electrodes or in filters. The use of nickel fibers alone, or nickel fibers in combination with ceramic fibers, find application in filter media.

In a preferred embodiment, the nylon binder is used in combination with zinc fibers to form a non-woven fibrous zinc sheet. Such a zinc or other metal fiber sheet can be used as an electrode, or a filter for plant effluent. Nylon as the binder is uniquely suited for such environments, and works quite well with the zinc fibers in terms of providing strength to the overall structure. In general, the amount of nylon binder in the final nonwoven sheet ranges from 5 to 10 wt %, whereas the amount of zinc fiber generally ranges from about 9 to 95%.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A method for forming a nonwoven fibrous web comprised of metal or refractory fibers with nylon as a binder, which comprises:
   (i) forming a foam furnish by agitating metal or refractory fibers in a foamed medium with an apparatus comprising agitation means mounted for displacement within the foamed medium, said agitating means comprising a leading surface facing in a direction of displacement, the leading surface including upper and lower portions converging in the direction of displacement to form a generally convex leading surface, and said agitating means also comprising a non-convex trailing surface facing away from the direction of displacement; and driving means for displacing the agitating means in the direction of displacement for dispersing and separating the fibers within the foamed medium; and
   (ii) passing the foam furnish onto a screen and defoaming the furnish to form a nonwoven web; and
   (iii) drying the formed web at a temperature sufficient to melt the nylon contained in the web.

2. The method of claim 1, wherein the fibers are comprised of carbon fibers.

3. The method of claim 1, wherein the fibers are comprised of metal fibers.

4. The method of claim 3, wherein the fibers are comprised of zinc, nickel or stainless steel fibers.

5. The method of claim 1, wherein the nylon is present in the foam furnish in the form of nylon fiber.

6. The method of claim 5, wherein the nylon fiber is of a sheath/core structure, with different nylon polymers comprising the sheath and core.

7. The method of claim 6, wherein the sheath portion of the fiber is comprised of nylon 6, and the core portion of the fiber is comprised of nylon 66.

* * * * *